United States Patent
Khokhar et al.

(10) Patent No.: US 12,138,622 B2
(45) Date of Patent: Nov. 12, 2024

(54) METHODS OF PRODUCING CATALYSTS COMPRISING ONE OR MORE OXIDES OF NICKEL AND ONE OR MORE OXIDES OF SILVER

(71) Applicant: Saudi Arabian Oil Company, Dhahran (SA)

(72) Inventors: Munir D. Khokhar, Dhahran (SA); Anne Madden, Dhahran (SA); Sohel K. Shaikh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/970,839

(22) Filed: Oct. 21, 2022

(65) Prior Publication Data

US 2024/0131502 A1  Apr. 25, 2024
US 2024/0226866 A9  Jul. 11, 2024

(51) Int. Cl.
*B01J 37/00* (2006.01)
*B01J 20/16* (2006.01)
(Continued)

(52) U.S. Cl.
CPC ......... *B01J 37/0045* (2013.01); *B01J 20/165* (2013.01); *B01J 21/08* (2013.01);
(Continued)

(58) Field of Classification Search
None
See application file for complete search history.

(56) References Cited

U.S. PATENT DOCUMENTS 3,764,563 A * 10/1973 Minachev .............. C10G 25/03
                                                       502/64
4,830,732 A *  5/1989 Mohr ....................... B01J 29/62
                                                      208/138
(Continued)

FOREIGN PATENT DOCUMENTS

CN      108855129 B     4/2021
EP        0181096 A1    5/1986
(Continued)

OTHER PUBLICATIONS

Hsu et al., Petroleum Science and Technology, 2019, (Hsu) (Year: 2019).*

(Continued)

*Primary Examiner* — Melissa S Swain
*Assistant Examiner* — Keling Zhang
(74) *Attorney, Agent, or Firm* — DINSMORE & SHOHL LLP

(57) ABSTRACT

According to embodiments, a method of producing a catalyst composition may include forming a slurry including an initial zeolite material, a surfactant, silica, and metal precursors, wherein the metal precursors contain a nickel-containing compound and a silver-containing compound, extruding the slurry to produce an extrudate, drying and calcining the extrudate to form a dried and calcined extrudate, hydrothermally treating the dried and calcined extrudate to form a hydrothermally-treated extrudate, and drying and calcining the hydrothermally-treated extrudate to produce the catalyst composition, wherein the catalyst composition includes zeolite, one or more oxides of nickel, and one or more oxides of silver.

18 Claims, 1 Drawing Sheet

(51) Int. Cl.
*B01J 21/08* (2006.01)
*B01J 23/66* (2006.01)
*B01J 35/30* (2024.01)
*C09K 23/00* (2022.01)
*C10G 11/05* (2006.01)

(52) U.S. Cl.
CPC .............. *B01J 23/66* (2013.01); *B01J 35/393* (2024.01); *C09K 23/003* (2022.01); *C10G 11/05* (2013.01)

(56) References Cited

U.S. PATENT DOCUMENTS

| | | |
|---|---|---|
| 6,307,117 B1 | 10/2001 | Tsunoda et al. |
| 10,407,311 B2 | 9/2019 | Ding et al. |

FOREIGN PATENT DOCUMENTS

| | | | |
|---|---|---|---|
| EP | 0510771 B1 | 7/1996 | |
| WO | WO-2011100218 A1 * | 8/2011 | ............ B01J 21/063 |

OTHER PUBLICATIONS

Saudi Arabia Examination Report pertaining to Application No. 123450607 dated Aug. 26, 2024, pp. 1-8.

* cited by examiner

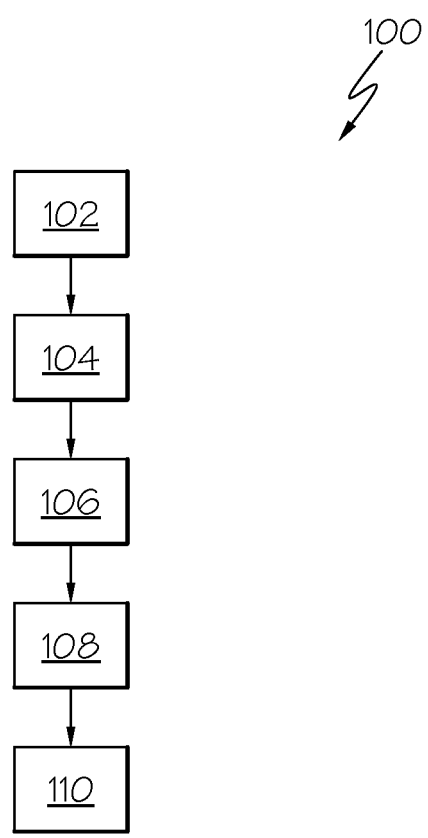

METHODS OF PRODUCING CATALYSTS COMPRISING ONE OR MORE OXIDES OF NICKEL AND ONE OR MORE OXIDES OF SILVER

TECHNICAL FIELD

The present disclosure relates to catalysts for chemical conversion of petrochemicals. More specifically, the present disclosure relates to methods for preparing catalysts which may be utilized in the conversion of petrochemicals.

BACKGROUND

Catalysts that include zeolites are utilized in a wide variety of industrial processes. For example, hydrocracking is a versatile catalytic process that converts various components of oils into lighter products by aromatic saturation, cracking, and/or isomerization reactions in the presence of hydrogen. These hydrocracking treatments sometimes require catalysts which can at least partially crack one or more larger molecules present in the oils into one or more smaller molecules. Overall, smaller olefins like ethylene and propylene are basic intermediates for a large proportion of the petrochemical industry and there is an increased demand for these chemical intermediates. As such, there is a need for new catalyst compositions and methods of making catalyst compositions.

SUMMARY

Described herein are catalyst compositions, methods of producing catalyst compositions, and methods of using the formed catalyst compositions to convert at least a portion of a petrochemical stream to one or more products. The catalysts described herein include zeolitic materials and incorporate oxides of nickel and oxides of silver into the catalyst compositions where the oxides may be embedded within the zeolitic material (contrary to some comparative catalysts where oxides are only present on or near the outer surfaces of the catalyst surface). According to embodiments disclosed herein, such a catalyst composition may be formed by utilizing a slurry that comprises zeolite material, a surfactant, silica, and metal precursors. The presence of the oxides of nickel and the oxides of silver in the catalyst compositions may improve the cracking capabilities of the catalyst. For example, the presence of the oxides of nickel and the oxides of silver in the catalyst compositions may improve the conversion of butenes to one or more smaller olefin products that may include propylene and ethylene.

According to embodiments described herein, a method of producing a catalyst composition may include forming a slurry comprising an initial zeolite material, a surfactant, silica, and metal precursors. The metal precursors may include a nickel-containing compound and a silver-containing compound. The method may further include extruding the slurry to produce an extrudate, drying and calcining the extrudate to form a dried and calcined extrudate, hydrothermally treating the dried and calcined extrudate to form a hydrothermally-treated extrudate, and drying and calcining the hydrothermally-treated extrudate to produce the catalyst composition. The catalyst composition may include zeolite, one or more oxides of nickel, and one or more oxides of silver.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawing.

BRIEF DESCRIPTION OF THE DRAWING

The following detailed description of specific embodiments of the present disclosure can be best understood when read in conjunction with the following drawing, where like structure is indicated with like reference numerals and in which:

FIG. 1 is a generalized flowchart of a method of producing a catalyst composition, according to one or more embodiments described in this disclosure.

Reference will now be made in greater detail to various embodiments, some embodiments of which are illustrated in the accompanying drawing. Whenever possible, the same reference numerals will be used throughout the drawing to refer to the same or similar parts.

DETAILED DESCRIPTION

References will now be made in greater detail to various embodiments. Referring to FIG. 1, a process flow diagram for a method of producing a catalyst composition is depicted. According to one or more embodiments, the catalyst compositions may be synthesized by a method 100 comprising at least step 102 of forming a slurry comprising an initial zeolite material, a surfactant, silica, and metal precursors, step 104 of extruding the slurry to produce an extrudate, step 106 of drying and calcining the extrudate to form a dried and calcined extrudate, step 108 of hydrothermally treating the dried and calcined extrudate to form a hydrothermally-treated extrudate, and step 110 of drying and calcining the hydrothermally-treated extrudate to produce the catalyst composition. Steps 102-110 may be performed in the order as is depicted in FIG. 1.

The process of FIG. 1 may be utilized to form a catalyst composition. As used in this disclosure, a "catalyst" or "catalyst composition" refers to any substance which increases the rate of a specific chemical reaction. Catalysts may be utilized to promote various reactions, such as, but not limited to, cracking reactions. As used in this disclosure, "cracking" generally refers to a chemical reaction where a molecule having carbon to carbon bonds is broken into more than one molecule by the breaking of one or more of the carbon to carbon bonds, or is converted from a compound which includes a cyclic moiety, such as an aromatic, to a compound which does not include a cyclic moiety.

As described herein, the catalyst compositions presently described may include zeolite (sometimes referred to as a zeolitic material). As used throughout this disclosure, "zeolite" may refer to micropore-containing inorganic materials with regular intra-crystalline cavities and channels of molecular dimension. Zeolites generally comprise a crystalline structure, as opposed to an amorphous structure such as what may be observed in some porous materials such as amorphous silica. Zeolites generally include a microporous framework which may be identified by a framework type. The microporous structure of zeolites (e.g., 0.3 nm to 2 nm pore size) may render large surface areas and desirable size-/shape-selectivity, which may be advantageous for catalysis. The zeolites described may include, for example, aluminosilicates, titanosilicates, or pure silicates. In embodiments, the zeolites described may include micropores (present in the microstructure of a zeolite), and additionally include mesopores. Micropores may refer to pores in a structure that have a diameter of less than or equal to 2 nm and greater than or equal to 0.1 nm, and mesopores may refer to pores in a structure that have a diameter of greater than 2 nm and less than or equal to 50 nm. Unless otherwise described herein, the "pore size" of a material refers to the average pore size, but materials may additionally include mesopores having a particular size that is not identical to the average pore size.

Generally, zeolites may be characterized by a framework type which defines their microporous structure. The zeolites described presently, in one or more embodiments, are not particularly limited by framework type. Framework types are described in, for example, "Atlas of Zeolite Framework Types" by Ch. Baerlocher et al, Fifth Revised Edition, 2001, which is incorporated by reference herein.

According to one or more embodiments, the zeolites described herein may include at least silicon atoms and oxygen atoms. In some embodiments, the microporous framework may include substantially only silicon and oxygen atoms (e.g., silica material). However, in additional embodiments, the zeolites may include other atoms, such as aluminum. Such zeolites may be aluminosilicate zeolites. In additional embodiments, the microporous framework may include titanium atoms, and such zeolites may be titanosilicate zeolites.

In one or more embodiments, the zeolite may comprise an aluminosilicate microstructure. The zeolite may comprise at least 98 wt. % of the combination of silicon atoms, oxygen atoms, and aluminum atoms. The molar ratio of Si/Al may be from 30 to 500, such as from 30 to 300, from 30 to 200, from 30 to 100, from 50 to 500, from 100 to 500, from 200 to 500, from 300 to 500, or any combination of these ranges.

In embodiments, the zeolites may comprise microstructures (which include micropores) characterized by, among others as *BEA framework type zeolites (such as, but not limited to, zeolite Beta), FAU framework type zeolites (such as, but not limited to, zeolite Y), MOR framework type zeolites, or MFI framework type zeolite (such as, but not limited to, ZSM-5). It should be understood that *BEA, MFI, MOR, and FAU refer to zeolite framework types as identified by their respective three letter codes established by the International Zeolite Association (IZA). Other framework types are contemplated in the presently disclosed embodiments.

In one or more embodiments, the zeolite may be an MFI framework type zeolite, such as a ZSM-5. "ZSM-5" generally refers to zeolites having an MFI framework type according to the IZA zeolite nomenclature and consisting majorly of silica and alumina, as is understood by those skilled in the art. ZSM-5 refers to "Zeolite Socony Mobil-5" and is a pentasil family zeolite that can be represented by the chemical formula $Na_nAl_nSi_{96}$-$nO_{192}16H_2O$, where $0<n<27$. Examples of suitable ZSM-5 zeolite include those commercially available from Zeolyst International, such as CBV2314, CBV3024E, CBV5524G, and CBV28014, and from TOSOH Corporation, such as HSZ-890 and HSZ-891.

In one or more embodiments, the zeolite may comprise an FAU framework type zeolite, such as zeolite Y or ultrastable zeolite Y (USY). As used herein, "zeolite Y" and "USY" refer to a zeolite having a FAU framework type according to the IZA zeolite nomenclature and consisting majorly of silica and alumina, as would be understood by one skilled in the art. In one or more embodiments, USY may be prepared from zeolite Y by steaming zeolite Y at temperatures above 500° C.

In one or more embodiments, the zeolite may comprise a *BEA framework type zeolite, such as zeolite Beta. As used in this disclosure, "zeolite Beta" refers to zeolite having a *BEA framework type according to the IZA zeolite nomenclature and consisting majorly of silica and alumina, as would be understood by one skilled in the art.

According to embodiments described herein, the catalyst compositions include one or more oxides of nickel and one or more oxides of silver. The oxides of nickel may be one or more of, but is not limited to, nickel (II) oxide, nickel (III) oxide, or oxonickelates. The oxides of silver may be one or more of, but is not limited to, silver (I) oxide or silver (I, III) oxide. In one or more embodiments, the catalyst composition may comprise from 0.5 wt. % to 1 wt. % oxides of nickel based on the total weight of the catalyst composition. For example, according to one or more embodiments, the catalyst composition may comprise from 0.6 wt. % to 1 wt. % oxides of nickel, from 0.7 wt. % to 1 wt. % oxides of nickel, from 0.8 wt. % to 1 wt. % oxides of nickel, from 0.9 wt. % to 1 wt. % oxides of nickel, from 0.5 wt. % to 0.9 wt. % oxides of nickel, from 0.5 wt. % to 0.8 wt. % oxides of nickel, from 0.5 wt. % to 0.7 wt. % oxides of nickel, from 0.5 wt. % to 0.6 wt. % oxides of nickel, from 0.6 wt. % to 0.9 wt. % oxides of nickel, or from 0.7 wt. % to 0.8 wt. % oxides of nickel based on the total weight of the catalyst composition. In one or more embodiments, the catalyst composition may comprise from 0.5 wt. % to 1 wt. % oxides of silver based on the total weight of the catalyst composition. For example, according to one or more embodiments, the catalyst composition may comprise from 0.6 wt. % to 1 wt. % oxides of silver, from 0.7 wt. % to 1 wt. % oxides of silver, from 0.8 wt. % to 1 wt. % oxides of silver, from 0.9 wt. % to 1 wt. % oxides of silver, from 0.5 wt. % to 0.9 wt. % oxides of silver, from 0.5 wt. % to 0.8 wt. % oxides of silver, from 0.5 wt. % to 0.7 wt. % oxides of silver, from 0.5 wt. % to 0.6 wt. % oxides of silver, from 0.6 wt. % to 0.9 wt. % oxides of silver, or from 0.7 wt. % to 0.8 wt. % oxides of silver based on the total weight of the catalyst composition. In one embodiment, the catalyst composition may comprise at or about 0.5 wt. % oxides of nickel and at or about 1 wt. % oxides of silver based on the total weight of the catalyst composition.

Without being bound by any particular theory, it is believed that the formed catalyst compositions comprising both oxides of nickel and oxides of silver allow the catalyst compositions to increase the yield of specifically ethylene and propylene products from a stream comprising or consisting essentially of butenes. When conventional catalysts do not comprise any metal oxides or comprise different metal oxides as described in the present application, the reaction between the conventional catalyst and a stream comprising or consisting essentially of butenes may lead to one or more side reactions that produce other products besides propylene and ethylene and/or further react with propylene and ethylene, thus reducing the total amount of propylene and ethylene that could be produced. Overall, it is believed that the oxides of nickel and oxides of silver present on the catalyst compositions as described in the present application are able to more efficiently hydrogenate the double bonds of one or more of 1-butene, cis-2-butene, and trans-2-butene, thus converting a larger portion of the one or more of 1-butene, cis-2-butene, and trans-2-butene into propylene and ethylene.

Again referring to FIG. 1, the process 100 may include step 102 of forming a slurry comprising an initial zeolite material, a surfactant, silica, and metal precursors. As described herein, a slurry refers to a semiliquid mixture or paste that comprises solid particles. In one or more embodiments, forming the slurry comprises mixing at least the initial zeolite material, the surfactant, a colloidal silica suspension comprising the silica, and one or more metal precursor solutions comprising the metal precursors. It is to be understood that the initial zeolite material, the surfactant, the silica, which may be present in a colloidal silica suspension, and the metal precursors, which may be present in one or more metal precursor solutions, can be mixed together in any order to form the slurry. The slurry comprising the initial zeolite material, the surfactant, the silica, and the metal precursors may be mixed by various mixing and co-mulling machines and processes known in the art for a necessary duration that produces a slurry composition that is of extrudable consistency.

In one or more embodiments, the slurry comprises an initial zeolite material. As described herein, an "initial zeolite material" refers to a zeolite, as described throughout this application, which does not comprise one or more oxides of nickel and one or more oxides of silver. It is to be understood that the methods described herein will result in the silica, the surfactant, and the metal precursors reacting with the initial zeolite material such that one or more oxides of nickel and one or more oxides of silver are embedded within the framework of the initial zeolite material to form the catalyst composition. In one or more embodiments, the initial zeolite material may have a Si/Al ratio of from 30 to 500. In one or more embodiments, the initial zeolite material may comprise ZSM-5 zeolite.

Further, as described herein, the slurry comprises silica. As used in this disclosure, "silica" refers to silicon dioxide with chemical formula $SiO_2$. The silica may be amorphous, denoting a lack of crystal structure, as defined by X-ray diffraction, where some short-range ordering of the silica may be present and is indicated by electron diffraction studies, but this ordering gives no sharp X-ray diffraction pattern. The silica may have an average particle size of from 1 nm to 100 nm. The silica may be introduced into the slurry by mixing a colloidal silica suspension comprising the silica with the initial zeolite material, the surfactant, and the metal precursors. The term "colloidal silica suspension" refers to a mixture where silica particles are suspended in one or more liquids, thus forming a heterogeneous mixture where the solid silica particles do not easily settle within the one or more liquids of the suspension. In some embodiments, the colloidal silica suspension may comprise silica and water. In one or more embodiments, the colloidal silica suspension may comprise from 20 wt. % to 50 wt. % silica based on the total weight of the colloidal silica suspension. The colloidal silica suspension may comprise silica suspended in one or more liquids, where the one or more liquids may or may not include water.

The slurry further comprises one or more surfactants. As used in this disclosure, a "surfactant" refers to a chemical that tends to reduce the surface tension between two liquids, between a gas and a liquid, or between a liquid and a solid. The surfactant may comprise a chemical compound containing a positively-charged portion with a long carbon chain that is neither positively-charged nor negatively-charged. The surfactant may interact with a zeolite to remove one or more silica components of the zeolite, thus increasing the size of one or more pores of the zeolite, where the increase in size may increase the amount of mesopores (pores having a diameter of greater than 2 nm and less than or equal to 50 nm) throughout the zeolite. In one or more embodiments, the surfactant may comprise one or more of tetrapropylammonium bromide (TPABr), tetrapropylammonium hydroxide (TPAOH), or tetraethylammonium hydroxide (TEAOH).

The slurry further comprises one or more metal precursors. The term "metal precursor" may refer to a chemical compound that contains one or more metals, such as silver or nickel, which can be transitioned into a metal oxide through the processes described herein. In one or more embodiments, at least a portion of the metal precursor or metal precursors become the metal oxide or metal oxides in the catalyst.

The metal precursors may be introduced into the slurry by mixing one or more metal precursor solutions comprising the metal precursors with the initial zeolite material, the surfactant, and the silica. In one or more embodiments, the metal precursors and metal precursor solutions may comprise one or more nickel-containing compounds and one or more silver-containing compounds. The term "nickel-containing compound" refers to any chemical compound that includes nickel. Generally, the nickel in the nickel-containing compound is the nickel that is present in the oxide of nickel in the formed catalyst. Similarly, the term "silver-containing compound" refers to any chemical compound that includes silver. Generally, the silver in the silver-containing compound is the silver that is present in the oxide of silver in the formed catalyst. In some embodiments, the nickel-containing compound may be chosen from, but is not limited to, nickel nitrate, nickel nitrate hexahydrate, or combinations thereof. In some embodiments, the silver-containing compound may be chosen from, but is not limited to, silver nitrate, silver nitrate hydrate, or combinations thereof. It is contemplated that any compound that comprises nickel and any compound that comprises silver may be mixed with the initial zeolite material, the surfactant, and the silica and result in incorporating at least a portion of the nickel or oxides of nickel from the compound comprising nickel and at least a portion of the silver or oxides of silver from the compound comprising silver onto the zeolite material.

Without being bound by any particular theory, it is believed that incorporating the nickel-containing compound and silver-containing compound into the slurry comprising the initial zeolite material, the surfactant, and the silica allows for the formation of a catalyst composition comprising one or more oxides of nickel and one or more oxides of silver that will increase the conversion of larger olefins to smaller olefins when the catalyst composition contacts a stream comprising the larger olefins as well as increase the overall lifetime of the catalyst.

In one or more embodiments of the present disclosure, the nickel-containing compound and the silver containing-compound are able to react with the initial zeolite material, the surfactant, and the silica of the slurry. During this step, it is believed that at least a portion nickel and/or oxides of nickel from the nickel-containing compound and at least a portion of silver and/or oxides of silver from the silver-containing compound are introduced into the framework of the initial zeolite material. Therefore, when compared to conventional processes that may add one or more metal compounds to a catalyst after the catalyst is fully formed, the catalyst compositions of the present disclosure will have the one or more oxides of nickel and the one or more oxides of silver embedded within the framework of the catalyst composition, whereas conventional processes will have one or more metal components deposited onto the surface of a catalyst. It is believed that having the one or more oxides of nickel and one or more oxides of silver embedded within the catalyst framework will better hydrogenate the double bonds present in larger olefins and more efficiently carry hydrogen to active sites of the catalyst, thus increasing the production of smaller olefin products from larger olefins. Additionally, it is believed that the presently described catalyst compositions, when compared to conventional catalysts produced by methods that deposit one or more metals onto the surface of an already-formed catalyst, will exhibit a higher catalytic activity after catalyst regeneration due to the catalyst composition avoiding unwanted side reactions that lead to an increase of coke formation on the catalyst composition, thus allowing the catalyst compositions to be used for a longer duration.

Still referring to FIG. 1, according to one or more embodiments, the method 100 of producing a catalyst composition may comprise step 104 of extruding the slurry to produce an extrudate. The term "extrudate" refers to the shaped product that is produced through an extrusion process. The extruding may be performed by various extruding processes known in the art, including, but not limited to, passing the slurry through an extruding machine or similar unit that optionally heats the slurry and propels the slurry through one or more dies that shape the slurry into one or more desired extrudates. The one or more extrudates may be formed into one or more three-dimensional shapes such as, but not limited to, spheres, pellets, cylinders, trilobe, and quadralobe shaped pieces, where other suitable geometric shapes are contemplated.

According to one or more embodiments, the method 100 of producing a catalyst composition may comprise step 106 of drying and calcining the extrudate to form a dried and calcined extrudate. Following the forming and shaping of the extrudate, the extrudate may be dried at a starting temperature of from 50° C. to 200° C. with an increase in temperature of from 1° C. to 5° C. per minute for a total drying time of from 5 hours to 10 hours. In some embodiments, the starting temperature may be a temperature of from 75° C. to 200° C., from 100° C. to 200° C., from 125° C. to 200° C., from 150° C. to 200° C., from 50° C. to 175° C., from 50° C. to 150° C., from 50° C. to 125° C., from 50° C. to 100° C., from 75° C. to 175° C., from 75° C. to 150° C., or from 100° C. to 150° C. In one or more embodiments, the increase in temperature may be from 1.5° C. to 4.5° C. or from 1.5° C. to 3° C. In some embodiments, the total drying time may be from 5.5 hours to 10 hours, from 6 hours to 10 hours, from 6.5 hours to 10 hours, from 7 hours to 10 hours, from 7.5 hours to 10 hours, from 8 hours to 10 hours, from 5 hours to 9.5 hours, from 5 hours to 9 hours, from 5 hours to 8.5 hours, from 5 hours to 8 hours, from 5 hours to 7.5 hours, from 5 hours to 7 hours, from 5.5 hours to 9 hours, or from 6 hours to 8.5 hours. In one embodiment, the drying of the extrudate may be performed at an initial starting temperature of 120° C. with an increase of 2° C. per minute over a total 8 hours. It is to be understood that the extrudate may be dried by any machine or unit and by any processes known in the art that results in increasing the temperature of the extrudate with a starting temperature, ramp rate increase in temperature, and for a drying time as listed above.

Following the drying of the extrudate, the extrudate may then be calcined. The extrudate may be calcined at a starting temperature of from 400° C. to 800° C. with an increase in temperature of from 1° C. to 5° C. per minute for a total calcining time of from 1 hour to 8 hours. In some embodiments, the starting temperature may be a temperature of from 450° C. to 800° C., from 500° C. to 800° C., from 550° C. to 800° C., from 600° C. to 800° C., from 650° C. to 800° C., from 700° C. to 800° C., from 400° C. to 750° C., from 400° C. to 700° C., from 400° C. to 650° C., from 400° C. to 600° C., from 400° C. to 550° C., from 400° C. to 500° C., from 450° C. to 750° C., from 450° C. to 700° C., or from 500° C. to 600° C. In one or more embodiments, the increase in temperature may be from 1.5° C. to 4.5° C. or from 1.5° C. to 3° C. In some embodiments, the total calcining time may be from 1.5 hours to 8 hours, from 2 hours to 8 hours, from 2.5 hours to 8 hours, from 3 hours to 8 hours, from 3.5 hours to 8 hours, from 4 hours to 8 hours, from 4.5 hours to 8 hours, from 5 hours to 8 hours, from 1 hour to 7.5 hours, from 1 hour to 7 hours, from 1 hour to 6.5 hours, from 1 hour to 6 hours, from 1 hour to 5.5 hours, from 1 hour to 5 hours, from 1 hour to 4.5 hours, from 1 hour to 4 hours, from 2 hours to 6 hours, from 2.5 hours to 5.5 hours, or from 3 hours to 5 hours. It is to be understood that the extrudate may be calcined by any machine or unit and by any processes known in the art that results in increasing the temperature of the extrudate with a starting temperature, ramp rate increase in temperature, and for a calcining time as listed above.

According to one or more embodiments, the method 100 of producing a catalyst composition may comprise step 108 of hydrothermally treating the dried and calcined extrudate to form a hydrothermally-treated extrudate. The term "hydrothermal treatment" refers to treating an object with water at high temperature and high pressure conditions. The hydrothermal treatment may include treating the dried and calcined extrudate at a temperature of from 50° C. to 250° C., such as from 50° C. to 200° C., from 50° C. to 150° C., from 100° C. to 250° C., from 150° C. to 250° C., or from 150° C. to 200° C., and for a time period of from 1 day to 5 days, such as for at or about 1 day, at or about 2 days, at or about 3 days, at or about 4 days, or at or about 5 days. The hydrothermal treatment of the dried and calcined extrudate may occur at a pressure that is greater than ambient pressure, where the pressure may be much greater than ambient pressure. The hydrothermal treatment of the dried and calcined extrudate may be conducted with a solid to liquid ratio of from 1:2 to 1:4, such as a solid to liquid ratio of 1:3. The solid to liquid ratio refers to the amount of the dried and calcined extrudate related to the amount of water during the hydrothermal treatment. The hydrothermal treatment of the dried and calcined extrudate may produce self-generated steam from water contained in the dried and calcined extrudate. In one or more embodiments, additional moisture may be applied during the hydrothermal treatment, such as in the form of pressurized saturated steam. In one or more embodiments, the hydrothermal treatment of the dried and calcined extrudate may be performed in an autoclave.

According to one or more embodiments, the method 100 of producing a catalyst composition may comprise step 110 of drying and calcining the hydrothermally-treated extrudate to produce the catalyst composition. Following the hydrothermal treatment of the dried and calcined extrudate that produces a hydrothermally-treated extrudate, the hydrothermally-treated extrudate may be dried at a starting temperature of from 50° C. to 200° C. with an increase in temperature of from 1° C. to 5° C. per minute for a total drying time of from 5 hours to 10 hours. In some embodiments, the starting temperature may be a temperature of from 75° C. to 200° C., from 100° C. to 200° C., from 125° C. to 200° C., from 150° C. to 200° C., from 50° C. to 175° C., from 50° C. to 150° C., from 50° C. to 125° C., from 50° C. to 100° C., from 75° C. to 175° C., from 75° C. to 150° C., or from 100° C. to 150° C. In one or more embodiments, the increase in temperature may be from 1.5° C. to 4.5° C. or from 1.5° C. to 3° C. In some embodiments, the total drying time may be from 5.5 hours to 10 hours, from 6 hours to 10 hours, from 6.5 hours to 10 hours, from 7 hours to 10 hours, from 7.5 hours to 10 hours, from 8 hours to 10 hours, from 5 hours to 9.5 hours, from 5 hours to 9 hours, from 5 hours to 8.5 hours, from 5 hours to 8 hours, from 5 hours to 7.5 hours, from 5 hours to 7 hours, from 5.5 hours to 9 hours, or from 6 hours to 8.5 hours. In one embodiment, the drying of the hydrothermally-treated extrudate may be performed at an initial starting temperature of 120° C. with an increase of 2° C. per minute over a total 8 hours. It is to be understood that the hydrothermally-treated extrudate may be dried by any machine or unit and by any processes known in the art that results in increasing the temperature of the hydrothermally-treated extrudate with a starting temperature, ramp rate increase in temperature, and for a drying time as listed above.

Following the drying of the hydrothermally-treated extrudate, the hydrothermally-treated extrudate may then be calcined. The hydrothermally-treated extrudate may be calcined at a starting temperature of from 400° C. to 800° C. with an increase in temperature of from 1° C. to 5° C. per minute for a total calcining time of from 1 hour to 8 hours. In some embodiments, the starting temperature may be a temperature of from 450° C. to 800° C., from 500° C. to 800° C., from 550° C. to 800° C., from 600° C. to 800° C., from 650° C. to 800° C., from 700° C. to 800° C., from 400° C. to 750° C., from 400° C. to 700° C., from 400° C. to 650° C., from 400° C. to 600° C., from 400° C. to 550° C., from 400° C. to 500° C., from 450° C. to 750° C., from 450° C. to 700° C., or from 500° C. to 600° C. In one or more embodiments, the increase in temperature may be from 1.5° C. to 4.5° C. or from 1.5° C. to 3° C. In some embodiments, the total calcining time may be from 1.5 hours to 8 hours, from 2 hours to 8 hours, from 2.5 hours to 8 hours, from 3 hours to 8 hours, from 3.5 hours to 8 hours, from 4 hours to 8 hours, from 4.5 hours to 8 hours, from 5 hours to 8 hours, from 1 hour to 7.5 hours, from 1 hour to 7 hours, from 1 hour to 6.5 hours, from 1 hour to 6 hours, from 1 hour to 5.5 hours, from 1 hour to 5 hours, from 1 hour to 4.5 hours, from 1 hour to 4 hours, from 2 hours to 6 hours, from 2.5 hours to 5.5 hours, or from 3 hours to 5 hours. It is to be understood that the hydrothermally-treated extrudate may be calcined by any machine or unit and by any processes known in the art that results in increasing the temperature of the hydrothermally-treated extrudate with a starting temperature, ramp rate increase in temperature, and for a calcining time as listed above.

According to one or more embodiments of the present disclosure, the catalyst composition may be used as a catalyst for hydrocracking reactions, as well as other hydroprocessing reactions. Hydrocracking reactions may be utilized to crack a hydrocarbon feed or fraction, and may be incorporated into a hydroprocessing treatment. Example feedstocks that may be processed by the catalyst compositions presently described include vacuum gas oil, deasphalted gas oil, and light cycled oil. Typically, hydroprocessing units may utilize hydrotreating reactions and a bottom bed hydrocracking reaction. In hydrotreating reactions, the major reactions may be sulfur, nitrogen, and metal removal (sometimes referred to as hydrodesulfurization (HDS), hydrodenitrogenation (HDN), and hydrodemetallization (HDM), respectively). The described catalyst compositions may have one or more of HDS, HDN, or HDM functionality, in addition to hydrocracking functionality. In the hydrocracking reaction, the major reaction is the conversion of the large hydrocarbons to small hydrocarbons (that is, cracking). For example, in one or more embodiments, the catalyst compositions as described herein may contact a stream comprising butene such that at least a portion of the butene is catalytically cracked to produce one or more products, where the one or more products may comprise propylene and ethylene. Hydrotreating may be used for upgrading petroleum fractions, where the cracking and conversion of the hydrocarbons of the petroleum fraction are generally lower than 10 wt. %. It should be understood that the catalyst compositions presently described may be operable as catalysts for other functions than hydrocracking, and should not be limited to a particular use, such as a hydrocracking catalyst in a hydroprocessing unit as described.

EXAMPLES

The various embodiments of methods of synthesizing catalyst compositions and using these formed catalysts will be further clarified by the following examples. The examples are illustrative in nature, and should not be understood to limit the subject matter of the present disclosure.

Example 1 Conventional Method of Synthesizing Catalyst Composition

A high Si/Al zeolite was mixed with surfactant (TPABr) along with emulsified silica (Ludox AS30). The slurry was later extruded using an extruding machine. The extrudates were dried at 120° C. for 8 hours at 2° C. per minute ramp rate, followed by calcination at 550° C. for 4 hours at 2° C. per minute ramp rate. The samples so prepared were subjected to thermal treatment in an autoclave with solid to water weight ratio of 1:3 at different times of 24, 48, 72, 96 and 120 hours. The samples were dried at 120° C. for 8 hours at 2° C. per minute ramp rate, followed by calcination at 550° C. for 4 hours at 2° C. per minute ramp rate.

Example 2 Co-Mulling Method of Synthesizing Catalyst Composition

A high Si/Al zeolite was mixed with surfactant (TPABr) along with emulsified silica (Ludox AS30). In the mixture, nickel and silver were co-mulled with the high Si/Al zeolite, surfactant, and emulsified silica and impregnated onto the zeolite using hexahydrates of nickel nitrate and silver nitrate precursors. The slurry was later extruded using an extruding machine. The extrudates were dried at 120° C. for 8 hours at 2° C. per minute ramp rate, followed by calcination at 550° C. for 4 hours at 2° C. per minute ramp rate. The samples so prepared were subjected to thermal treatment in an autoclave with solid to water weight ratio of 1:3 at different times of 24, 48, 72, 96 and 120 hours. The samples were dried at 120° C. for 8 hours at 2° C. per minute ramp rate, followed by calcination at 550° C. for 4 hours at 2° C. per minute ramp rate. The final catalyst composition was tested and resulted in having 0.5 wt. % oxides of nickel and 1 wt. % oxides of silver based on the total weight of the catalyst composition.

Multiple aspects of the present application are disclosed herein. A first aspect includes a method of producing a catalyst composition, the method comprising: forming a slurry comprising an initial zeolite material, a surfactant, silica, and metal precursors, wherein the metal precursors comprise a nickel-containing compound and a silver-containing compound; extruding the slurry to produce an extrudate; drying and calcining the extrudate to form a dried and calcined extrudate; hydrothermally treating the dried and calcined extrudate to form a hydrothermally-treated extrudate; and drying and calcining the hydrothermally-treated extrudate to produce the catalyst composition, wherein the catalyst composition comprises zeolite, one or more oxides of nickel, and one or more oxides of silver.

A second aspect includes any above aspect, wherein forming the slurry comprises mixing at least the initial zeolite material, the surfactant, a colloidal silica suspension comprising the silica, and a metal precursor solution comprising the metal precursors.

A third aspect includes any above aspect, wherein the colloidal silica suspension comprises silica and water.

A fourth aspect includes any above aspect, wherein the colloidal silica suspension comprises from 20 wt. % to 50 wt. % silica based on the total weight of the colloidal silica suspension.

A fifth aspect includes any above aspect, wherein the initial zeolite material comprises ZSM-5 zeolite.

A sixth aspect includes any above aspect, wherein the initial zeolite material has a Si/Al ratio of from 30 to 500.

A seventh aspect includes any above aspect, wherein the nickel-containing compound is chosen from nickel nitrate, nickel nitrate hexahydrate, or combinations thereof.

An eighth aspect includes any above aspect, wherein the silver-containing compound is chosen from silver nitrate, silver nitrate hydrate, or combinations thereof.

A ninth aspect includes any above aspect, wherein the catalyst composition comprises from 0.5 wt. % to 1 wt. % oxides of nickel based on the total weight of the catalyst composition.

A tenth aspect includes any above aspect, wherein the catalyst composition comprises from 0.5 wt. % to 1 wt. % oxides of silver based on the total weight of the catalyst composition.

An eleventh aspect includes any above aspect, wherein the surfactant comprises tetrapropylammonium bromide (TPABr), tetrapropylammonium hydroxide (TPAOH), tetraethylammonium hydroxide (TEAOH), or combinations thereof.

A twelfth aspect includes any above aspect, wherein hydrothermally treating the dried and calcined extrudate is performed in an autoclave.

A thirteenth aspect includes any above aspect, wherein the hydrothermal treatment is at a temperature of from 150° C. to 250° C.

A fourteenth aspect includes any above aspect, wherein the hydrothermal treatment is for a time period of from 1 day to 5 days.

A fifteenth aspect includes any above aspect, wherein the hydrothermal treatment is conducted with a solid to liquid ratio of from 1:2 to 1:4.

A sixteenth aspect includes a method of catalytically cracking butene, the method comprising: contacting a catalyst composition with a stream comprising butene such that at least a portion of the butene is catalytically cracked to produce one or more products; wherein the catalyst composition is formed by the process of any above aspect.

A seventeenth aspect includes any above aspect, wherein the one or more products comprise propylene and ethylene.

An eighteenth aspect includes any above aspect, wherein: the initial zeolite material comprises ZSM-5 zeolite; and the initial zeolite material has a Si/Al ratio of from 30 to 500.

A nineteenth aspect includes any above aspect, wherein: the catalyst composition comprises from 0.5 wt. % to 1 wt. % oxides of nickel based on the total weight of the catalyst composition; and the catalyst composition comprises from 0.5 wt. % to 1 wt. % oxides of silver based on the total weight of the catalyst composition.

A twentieth aspect includes any above aspect, wherein: hydrothermally treating the dried and calcined extrudate is performed in an autoclave; the hydrothermal treatment is at a temperature of from 150° C. to 250° C.; and the hydrothermal treatment is for a time period of from 1 day to 5 days.

For the purposes of defining the present technology, the transitional phrase "consisting of" may be introduced in the claims as a closed preamble term limiting the scope of the claims to the recited components or steps and any naturally occurring impurities.

For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B and C should be interpreted as also disclosing a composition "consisting of" components A, B, and C as well as a composition "consisting essentially of" components A, B, and C.

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method of producing a catalyst composition, the method comprising:
   forming a slurry comprising an initial zeolite material, a surfactant, silica, and metal precursors, wherein the metal precursors comprise a nickel-containing compound and a silver-containing compound;

extruding the slurry to produce an extrudate;

drying and calcining the extrudate to form a dried and calcined extrudate;

hydrothermally treating the dried and calcined extrudate to form a hydrothermally-treated extrudate, wherein the hydrothermal treatment is at a temperature of from 50° C. to 250° C.; and drying and calcining the hydrothermally-treated extrudate to produce the catalyst composition, wherein the catalyst composition comprises zeolite, one or more oxides of nickel, and one or more oxides of silver.

2. The method of claim 1, wherein forming the slurry comprises mixing at least the initial zeolite material, the surfactant, a colloidal silica suspension comprising the silica, and a metal precursor solution comprising the metal precursors.

3. The method of claim 2, wherein the colloidal silica suspension comprises silica and water.

4. The method of claim 2, wherein the colloidal silica suspension comprises from 20 wt. % to 50 wt. % silica based on a total weight of the colloidal silica suspension.

5. The method of claim 1, wherein the initial zeolite material comprises ZSM-5 zeolite.

6. The method of claim 1, wherein the nickel-containing compound is chosen from nickel nitrate, nickel nitrate hexahydrate, or combinations thereof.

7. The method of claim 1, wherein the silver-containing compound is chosen from silver nitrate, silver nitrate hydrate, or combinations thereof.

8. The method of claim 1, wherein the catalyst composition comprises from 0.5 wt. % to 1 wt. % oxides of nickel based on a total weight of the catalyst composition.

9. The method of claim 1, wherein the catalyst composition comprises from 0.5 wt. % to 1 wt. % oxides of silver based on a total weight of the catalyst composition.

10. The method of claim 1, wherein the surfactant comprises tetrapropylammonium bromide (TPABr), tetrapropylammonium hydroxide (TPAOH), tetraethylammonium hydroxide (TEAOH), or combinations thereof.

11. The method of claim 1, wherein the hydrothermal treatment is performed in an autoclave.

12. The method of claim 1, wherein the hydrothermal treatment is at a temperature of from 150° C. to 250° C.

13. The method of claim 1, wherein the hydrothermal treatment is for a time period of from 1 day to 5 days.

14. The method of claim 1, wherein the hydrothermal treatment is conducted with a solid to liquid weight ratio of from 1:2 to 1:4.

15. The method of claim 1, wherein:

the catalyst composition comprises from 0.5 wt. % to 1 wt. % oxides of nickel based on the total weight of the catalyst composition; and the catalyst composition comprises from 0.5 wt. % to 1 wt. % oxides of silver based on the total weight of the catalyst composition.

16. The method of claim 1, wherein:

hydrothermal treatment is performed in an autoclave;

the hydrothermal treatment is at a temperature of from 150° C. to 250° C.; and the hydrothermal treatment is for a time period of from 1 day to 5 days.

17. A method of catalytically cracking butene, the method comprising:

producing a catalyst composition by the method of claim 1;

contacting the catalyst composition with a stream comprising butene such that at least a portion of the butene is catalytically cracked to produce one or more products.

18. The method of claim 17, wherein the one or more products comprise propylene and ethylene.

\* \* \* \* \*